United States Patent
Poret et al.

(10) Patent No.: US 9,816,876 B2
(45) Date of Patent: Nov. 14, 2017

(54) MEASUREMENT OF THE HOMOGENEOUS TEMPERATURE OF A COIL BY INCREASING THE RESISTANCE OF A WIRE

(71) Applicant: LABINAL POWER SYSTEMS, Blagnac (FR)

(72) Inventors: Philippe Poret, Crecy la Chappelle (FR); Tony Lhommeau, Lieusaint (FR)

(73) Assignee: LABINAL POWER SYSTEMS, Blagnac (FR)

( * ) Notice: Subject to any disclaimer, the term of this patent is extended or adjusted under 35 U.S.C. 154(b) by 146 days.

(21) Appl. No.: 14/767,270

(22) PCT Filed: Feb. 13, 2014

(86) PCT No.: PCT/FR2014/050292
§ 371 (c)(1),
(2) Date: Aug. 11, 2015

(87) PCT Pub. No.: WO2014/125220
PCT Pub. Date: Aug. 21, 2014

(65) Prior Publication Data
US 2015/0377715 A1    Dec. 31, 2015

(30) Foreign Application Priority Data

Feb. 14, 2013 (FR) .................................... 13 51290

(51) Int. Cl.
| | | |
|---|---|---|
| H01F 27/08 | (2006.01) |
| G01K 7/16 | (2006.01) |
| G01K 7/18 | (2006.01) |
| G01K 7/22 | (2006.01) |
| G01K 13/00 | (2006.01) |
| H01F 27/00 | (2006.01) |
| H01F 27/28 | (2006.01) |
| H01F 27/29 | (2006.01) |

(52) U.S. Cl.
CPC ............... *G01K 7/16* (2013.01); *G01K 7/183* (2013.01); *G01K 7/223* (2013.01); *G01K 13/00* (2013.01); *H01F 27/008* (2013.01); *H01F 27/2823* (2013.01); *H01F 27/29* (2013.01)

(58) Field of Classification Search
CPC ........... H01F 27/22; H01F 27/10; H01F 27/14
USPC .......................................................... 336/55
See application file for complete search history.

(56) References Cited

U.S. PATENT DOCUMENTS

2015/0219695 A1* 8/2015 Zheng .................. H01F 27/402
324/72

* cited by examiner

*Primary Examiner* — Tsz Chan
(74) *Attorney, Agent, or Firm* — Blakely Sokoloff Taylor & Zafman LLP

(57) ABSTRACT

The invention relates to a method of measuring the temperature of a coiled component comprising the injection of a known DC current into a gauge wire (1) made of resistive material, the resistance of the gauge wire varying with temperature according to a known law, the measurement of potential difference between the terminals (7a, 7b) of said gauge wire, and a step of calculation transforming the potential difference into a mean temperature of the gauge wire, said gauge wire (1) being wound inside the coil, and arranged as a series of "outbound" turns (5) and a series of "inbound" turns (6) associated pairwise with a geometry and a position that are substantially equal. It also relates to a component made in order to be able to implement this method and the measurement device as a whole.

4 Claims, 1 Drawing Sheet

MEASUREMENT OF THE HOMOGENEOUS TEMPERATURE OF A COIL BY INCREASING THE RESISTANCE OF A WIRE

TECHNICAL FIELD

The present invention relates to the monitoring of electrical systems installed on an aircraft. It relates more particularly to measuring the temperature of a coiled electrical component.

PRIOR ART

A certain number of electronic devices installed on aircraft, in particular computers, are placed in zones where they risk being in contact with a product that is flammable at high temperature, such as engine oil. In this case, for example, the safety rules require that the skin temperature of each casing does not exceed the critical temperature of 204° C., the spontaneous ignition threshold of engine oil.

All passive components that may exceed this temperature must be monitored in order to control this requirement.

With regard more particularly to coiled components, the solution currently used consists of a temperature probe integrated on the outside of the coil that sends an alert message should the critical temperature be exceeded.

This solution has the first drawback of being expensive since it introduces additional specific equipment, i.e. the temperature probe, which is extraneous to the component to be monitored. It poses difficulties of integration, since the temperature probes have not been especially designed to be fitted to the component. Finally, they provide a local temperature at the point on the surface of the component where the sensor of the probe was fixed. The indication by the probe that a temperature is in conformity does not necessarily guarantee that the critical temperature has not been exceeded elsewhere on the component.

Because of this, sizing and positioning the probe requires characterising the assembly consisting of probe and coiled component in order to reduce the risks of the critical temperature being exceeded or of false alarms being sent to the detection system, and also avoiding the impact in terms of mass and cost of an oversizing of the coil, caused by the need to limit its spontaneous heating in particular in applications of the pulse type and to establish a margin vis-à-vis the measurement error.

Disclosure of the Technical Problem and of the Invention

The aim of the invention is to provide a simple and robust solution in the face of these integration problems, in particular for coiled components, while guaranteeing that the temperature measurement makes it possible to comply with the safety level without being obliged to adopt an excessive safety margin.

The invention concerns a method for measuring the temperature of a high-power coiled component for aeronautical applications, comprising the measurement of the potential difference between the terminals of a gauge wire made from resistive material in which a known DC current is passed, the resistance of the gauge wire varying with the temperature in accordance with a known law, and a calculation step converting the potential difference into the mean temperature of the gauge wire, said gauge wire being wound inside the coil, in turns arranged in a series of "outbound" turns and a series "inbound" turns associated in pairs with a geometry and position that are substantially equal. This method is characterised in that said gauge wire has diameter in a range from 0.05 mm to 0.25 mm and a length adjusted so as to obtain, by producing at least twenty turns, variations in resistance of between 2 and 8 ohms at a temperature varying between −60° C. and 200° C.

The invention achieves its objective since, because the heat is produced inside the component, the mean temperature inside the component obtained by the measurement on the gauge wire overestimates the temperature that can be reached on the surface. Therefore the more precise the measurement, the closer the threshold will be approached while being certain not to exceed it. Moreover, in particular for coiled components, the measurement must compensate for any disturbances caused by the presence of magnetic fields, the gradients of which create an electromotive force in the windings that they pass through. Having "outbound" and "inbound" turns compensating for themselves in pairs considerably simplifies the measuring circuit. In addition, the concern here is with high-power components in aeronautics, where the diameter of the coils may vary between 1 cm and 30 cm. In this context, compared for example with platinum probe technologies using very fine wires, around 0.01 cm in diameter, with resistances of around 100 ohms, using wires with a greater diameter and resistances of a few ohms makes it possible to integrate this technology in the component while having the necessary measuring precision.

Advantageously, the use of a conductive material the resistivity of which varies linearly with the temperature in the range of temperatures measured simplifies the calculations accordingly.

Preferably the gauge wire is made from copper, a common material the resistivity of which is a linear function of the temperature in the operating range for aeronautical applications.

The precise measurement of the temperature is obtained by attaching two wires to the ends of the gauge wire to measure the potential difference.

The invention also relates to a high-power coiled component for aeronautical applications, characterised in that it comprises a wire made from resistive material, the resistance of which varies with the temperature according to a known law, said wire of conductive material being wound inside the coil and arranged in a series of "outbound" turns and a series of "inbound" turns, associated in pairs with a geometry and a position that are substantially equal, said gauge wire in addition having a diameter in a range from 0.05 mm to 0.25 mm with a length adjusted so as to obtain, by producing at least 20 turns, variations in resistance of between 2 and 8 ohms for a temperature varying between −60° C. and 200° C., and two connections able to connect the ends of said gauge wire to external electronic equipment.

It relates more particularly to a coiled component comprising at least two active windings, one surrounding the other, and the turns of the gauge wire being inserted between the two active windings.

Advantageously, this component comprises two complementary connections attached to the terminals of the gauge wire.

Such a component is able to be connected to the measuring appliances necessary for determining the mean temperature inside the component.

The invention also concerns an electronic device for aeronautical applications comprising at least one component according to the invention, a means for generating direct current connected to the ends of the gauge wire, a means for measuring a potential difference between the complementary connections and a computing means able to convert the signal from the potential difference measuring means and the information on said direct current into a temperature signal.

Finally, the invention relates to a method for manufacturing a coiled component according to the invention, comprising a step of calibrating the length of the gauge wire in order to obtain a given resistance at a given temperature, before the gauge wire is installed in the coiled component, and a step of connecting two complementary output wires to the terminals of the gauge wire corresponding to the calibrated resistance.

With a calibration of the gauge wire to within a milliohm, this manufacturing method makes it possible to achieve precision of +/−0.3% on the estimation of the temperature in the coiled components used in aeronautics.

DESCRIPTION OF AN EMBODIMENT OF THE INVENTION

A non-limitative embodiment of the invention is now described in more detail with reference to the accompanying drawings, on which:

Figure 1:
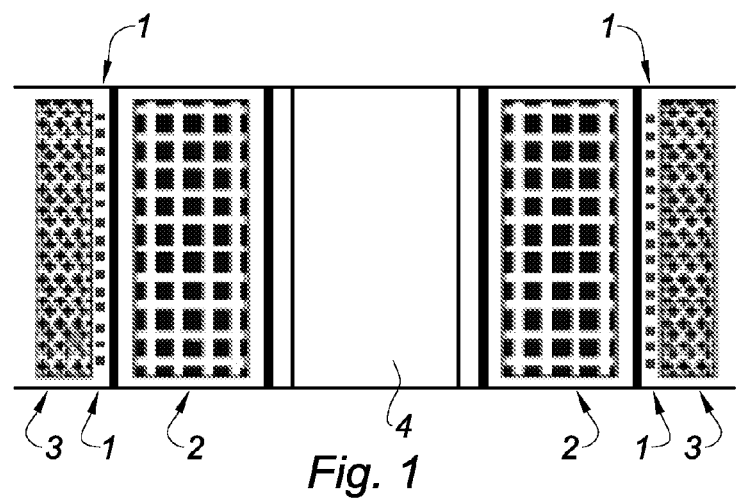
FIG. 1 is an axial section of a coiled component.

A typical coiled component, for example as transformer as shown in FIG. 1, comprises two active windings 2 and 3. They are configured so that there is an outside winding 3 surrounding the inside winding 2, the whole enveloping a column 4 with a central core.

The heating of the component is due essentially to the Joule losses in the active windings because of the high currents used. It is a case of estimating the heating of the high-power coiled components, preferably for aeronautical applications. A small-diameter copper gauge wire 1 is therefore wound on a cylinder between the two active windings. Measuring the variation in resistance of the gauge wire 1 related to the variation in resistivity of the material in the component as a function of temperature makes it possible to obtain a temperature measurement representing that of the inside of the coil, and therefore exceeding the temperature that is observed on the skin of the component.

Copper is chosen because it makes it possible to obtain correct measurements with small wire diameters. In addition, it is a common material in electronics, compared for example with platinum used in certain temperature measurement equipment.

Moreover, the device is easy to integrate in the manufacture of the component described since it suffices to wind the gauge wire 1 at the same time as the inside active winding 2, on its external surface, before assembling it with the rest of the component, which does not require any additional operation. In general terms, the components the temperature of which it is wished to monitor have a diameter of between 1 and 30 cm. The diameter of the gauge wire used is generally between 0.25 and 0.05 mm, which, at a nominal resistance of 6 ohms at ambient temperature (20° C.), gives rise to a length of gauge wire of between 17 meters and 1.5 meters, that is to say at least twenty turns. This length may have an impact on the final diameter of the component, the wire being able to represent between 0.1% and 10% of the total volume of the conductors. It can therefore be seen that this device disturbs the geometry of the component in a proportion of the same order of magnitude as the percentage of gauge wire, which is small compared with conventional means.

FIG. 1 presents an embodiment with two active windings. In a variant concerning a coiled component with more than two active windings, the gauge wire is wound inside the coil placed between the two innermost windings. In another variant, concerning a single active winding, the gauge wire is wound against the inside face of this winding.

The temperature of the coiled components is monitored in a range of around −60° C. to +200° C. In this temperature range, the resistivity of the copper as a function of temperature is linear and is expressed in the form:

$$\rho = \rho_0 \cdot (1 + \alpha \cdot \theta) \tag{1}$$

$\alpha = 0.00427$ (coefficient of variation of the resistivity of copper as a function of temperature)

$\theta$ = temperature expressed in ° C.

$\rho_0$ = resistivity of copper at 0° C. in ohms·meters ($1.6 \, 10^{-8}$ ohms·m)

For a gauge wire of given length and cross section, a resistance is therefore obtained that is expressed in a similar manner:

$$R = R_0 \cdot (1 + \alpha \cdot \theta) \tag{2}$$

$R_0$ = resistance of the gauge wire at 0° C. in ohms.

In addition, the potential difference being given by Joule's law, in this case the temperature is obtained easily by applying a known current I, expressed in amperes, passing through the gauge wire, by measuring the potential difference U, expressed in volts, at the terminals of said gauge wire by the formula:

$$\theta = (U/I \cdot R_0 - 1) \cdot (1/\alpha) \tag{3}$$

For the coiled components envisaged, the value of $R_0$ sought during this calibration is between 2 and 8 ohms. This makes it possible to have variations in the value of the resistance of several ohms, between 2 and 8 ohms, over the range of temperature variations expected for the component in operation. The amplitude of this variation in resistance for the temperature range sought (from −60° C. to +200° C.) makes it possible to have a measurement with a precision greater than 1%, appreciably improved compared with that of conventional means, as detailed below in an example.

It can be envisaged to use materials other than copper. If the resistivity of the material is not a linear function of temperature, the relationship between the temperature and the measurements of the potential difference U will simply be a little more complex to program. Advantageously, this material will have a resistivity of between 1 and $10 \, 10^{-8}$ ohms·m, preferably between 1 and $7 \, 10^{-8}$ ohms·m, and will make it possible to manufacture gauge wires the resistance of which will vary substantially in the ranges mentioned above for the range of operating temperatures of the coiled component.

To be able to use this formula, it is however necessary to eliminate the sources of parasitic potential differences. In the case of the coiled component, the winding of the gauge wire having a magnetic flux pass through it, an electromotive force, equal to the derivative of the magnetic flux passing through the winding, will appear at the terminals (Faraday's law).

Figure 2:
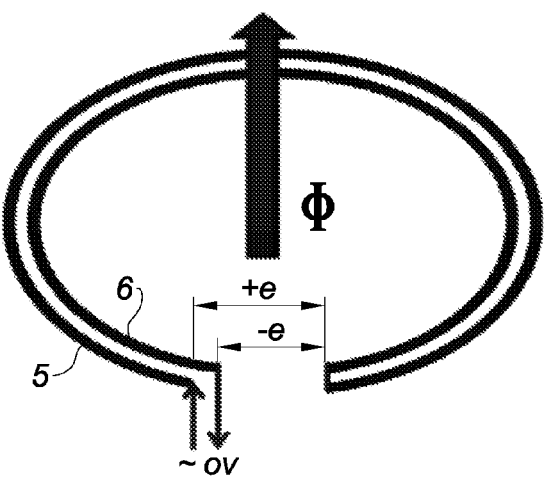
FIG. 2 is the outline diagram of two turns circulating the measuring current in opposite directions.
Figure 3:
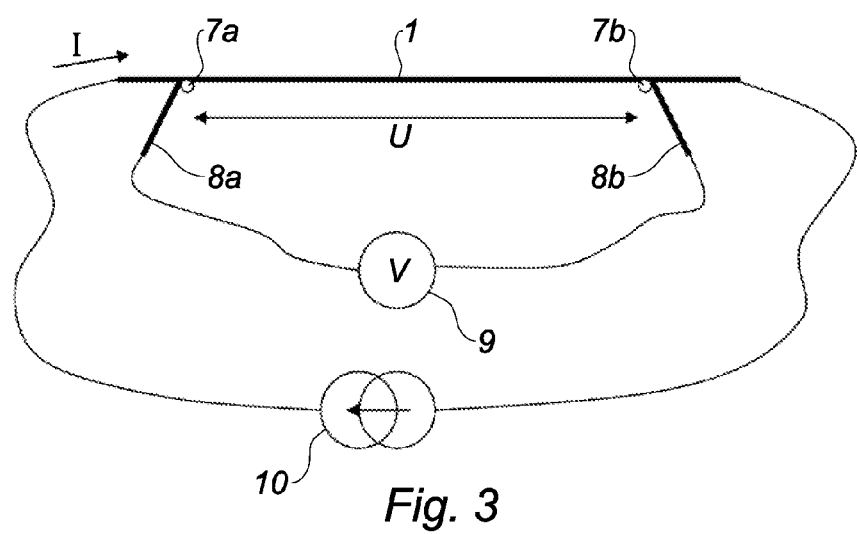
FIG. 3 shows the principle of measuring with four wires on the gauge wire.

In order to compensate for this electromotive force and to simplify the associated measuring circuit, the coiling of the gauge wire is effected by folding the wire on itself at its middle, and then winding this double wire. Thus two series of turns are created, associated in pairs in an "outbound"

turn 5 and an "inbound" turn 6 as illustrated in FIG. 2. These two turns have substantially the same position in space and the same form. It is therefore the same magnetic flux Φ that passes through them and thus the electromotive forces created at their terminals are equal and of opposite signs. The resultant of the electromotive forces observed at the terminals of the gauge wire therefore remains substantially zero.

Other geometrical arrangements of the winding of the gauge wire can be envisaged for thus matching the "outbound" turns 5 and "inbound" turns 6 in pairs. In all cases, it is important to keep the "outbound" and "inbound" parts of the conductor as close as possible to each other, including at the start and end of the winding, in order to thus guarantee the equality of surface area of turns through which the magnetic flux passes.

By injecting a direct current, it is then possible to determine the temperature at the core of the component by means of formula (3). A filtering of the "low-pass" type is used to dispense with any residual voltage related to the difference in equivalent surface area through which magnetic flux passes for the "outbound" and "inbound" turns.

Preferably, the voltage is measured using the so-called 4-wire method, or Kelvin method. In this method, the terminals 7a and 7b of the length of gauge wire that corresponds to the known value $R_0$ of the resistance at the reference temperature and which is used in the calculations are considered. Two complementary wires 8a and 8b are attached to these terminals by brazing, soldering or any other connection means. Next the gauge wire 1 is connected by its two ends to a current-generating means 10 and the two complementary wires 8a and 8b are connected to a means for measuring potential, a voltmeter 9. The impedance of the voltmeter 9 being very high, the current that passes through the connection wires is negligible and the potential difference is measured with great precision over the exact length of wire corresponding to the resistance $R_0$. The intensity of the current passing through the gauge wire is moreover indicated with good precision by the current-generating means.

On the other hand, the copper wires are provided with a certain tolerance on their variation in radius. Typically, the mean radius may vary by +/−2.5% for wires with a diameter of 0.1 mm. The uncertainties on the temperature measured will therefore be around 5% if the nominal data are relied on.

Preferentially, the precision of measurement is improved further by calibrating the gauge wire before integrating it in the component. Because of the order of magnitude of a few ohms of the resistance of the gauge wire (see the example provided in table (1)), the calibration can be carried out with a micro-ohmmeter in order to achieve precisions of around 0.2% on the resistance $R_0$. When the operator has identified the precise length corresponding to the theoretical value of the resistance over 6 m (see table (1) for an embodiment with the accepted tolerances), he connects, to the corresponding terminal 7a and 7b, the complementary wires 8a and 8b used for the potential measurement and then winds the gauge wire in the coiled component. This measurement means, with the calibration carried out, makes it possible to have a temperature probe having a precision of +/−0.3%, to be compared with the current typical mean value of 1% with temperature probes placed against the component. In addition, the manufacturing cost of a temperature probe according to the invention is less.

In a variant embodiment, errors introduced by the uncertainties as to the current value I supplied by the means 10 are dispensed with in an additional manner by directly measuring the resistance of the gauge wire between the terminals 8a and 8b. For this purpose, a resistor of known value is placed at a point on the circuit of the current I not subjected to the variations in temperature of the coiled component. The variation in potential is measured at the terminals of this resistor and the resistance of the gauge wire is obtained directly by a ratio between the two potential differences measured.

Compared with a component equipped with a temperature gauge, the assembly installed in the aircraft therefore consists of this modified component with a current generator, a voltmeter and a computing module able to supply the temperature from the measurements made, the latter three components being similar in complexity to ohmmeters available on the market.

TABLE (1)

Example concerning an autotransformer, evaluation of the measurement area on the temperature between −55° C. and +175° C.
Mean length of a turn: 15 cm
Total number of turns: ("outbound" and "inbound"): 40
Length of wire used: 6 m
Mean radius of wire: 0.07081035 mm; manufacturing tolerance: +/−2.5%

|  | Temperature ° C. | Minimal values | Nominal values | Maximum values |
|---|---|---|---|---|
| Resistance (in ohms) of the gauge wire adjusted around 6 m after calibration at +/−0.01 ohms | −55 | 4.456 | 4.466 | 4.476 |
|  | 25 | 6.700 | 6.710 | 6.720 |
|  | 175 | 10.908 | 10.918 | 10.928 |
| Tolerance of the resistance of the invention | −55 | −0.224 | 0 | 0.224 |
|  | 25 | −0.149 | 0 | 0.149 |
|  | 175 | −0.092 | 0 | 0.092 |

The invention claimed is:

1. Method for measuring the temperature of a coiled component, a method comprising the injection of a known direct current into a gauge wire made from resistive material, the resistance of the gauge wire varying with the temperature, the measurement of a potential difference between the terminals of said gauge wire, and a calculation step converting the potential difference into the mean temperature of the gauge wire by determining its resistance,
   said gauge wire being wound inside the coil, and arranged in a series of "outbound" turns and a series of "inbound" turns associated in pairs with a geometry and position that are substantially equal,
   a method characterised in that:
      said gauge wire has a diameter in a range from 0.05 mm to 0.25 mm, and in that winding the gauge wire produces at least twenty turns inside the coil,
      the variations in resistance of the gauge wire being between 2 and 8 ohms for a temperature varying between −60° C. and 200° C., and
      the length being adjusted so as to obtain said variations in resistance in said temperature range, in order to apply said method to a high-powered coiled component for aeronautical applications.

2. Method for measuring the temperature of a coiled component according to claim 1, in which the relationship between the temperature and the resistance is linear in the temperature range measured.

3. Method for measuring the temperature of a coiled component according to claim 1, in which the material of the wire is copper.

4. Method for measuring the temperature of a coiled component according to claim 1, in which the measurement of the potential difference uses two complementary wires attached to the terminals of the gauge wire.

* * * * *